United States Patent [19]

McKinney

[11] Patent Number: 4,773,349
[45] Date of Patent: Sep. 27, 1988

[54] BOAT DOCK BUMPER

[76] Inventor: Ronald W. McKinney, 1808 W. Park St., Harlan, Iowa 51537

[21] Appl. No.: 129,605

[22] Filed: Dec. 7, 1987

[51] Int. Cl.$^4$ ............................................. B63B 69/02
[52] U.S. Cl. ..................................... 114/219; 405/212; 267/30
[58] Field of Search ................ 114/219; 405/212–215; 267/139, 140, 30, 158

[56] References Cited

U.S. PATENT DOCUMENTS

| 1,623,888 | 4/1927 | Pasini | 114/219 |
| 2,405,502 | 8/1946 | Harris | 114/45 |
| 3,222,082 | 12/1965 | Raidel | 267/30 |
| 3,581,700 | 6/1971 | Storch | 114/219 |
| 3,864,922 | 2/1975 | Dial et al. | 61/48 |
| 4,307,876 | 12/1981 | Cleaves | 405/212 |
| 4,554,882 | 11/1985 | Lemmens | 114/219 |
| 4,650,371 | 3/1987 | Sawaragi et al. | 405/211 |

Primary Examiner—Sherman D. Basinger
Assistant Examiner—Edwin L. Swinehart
Attorney, Agent, or Firm—Henderson & Sturm

[57] ABSTRACT

A boat dock bumper including an elongated vertical plate having an inner face and an outer face. A spring steel strap attached to the inner face of the plate and disposed to bow away from the inner face. The strap is attached at one end of the plate by a sliding attachment and at the other end of the plate by a pivoting attachment. Means are provided by way of a plate for attaching the strap to a boat dock such that the outer face of the plate will contact the hull of an approaching watercraft. The plate is movable between an at-rest position and a compressed position when contacted by a watercraft.

12 Claims, 2 Drawing Sheets

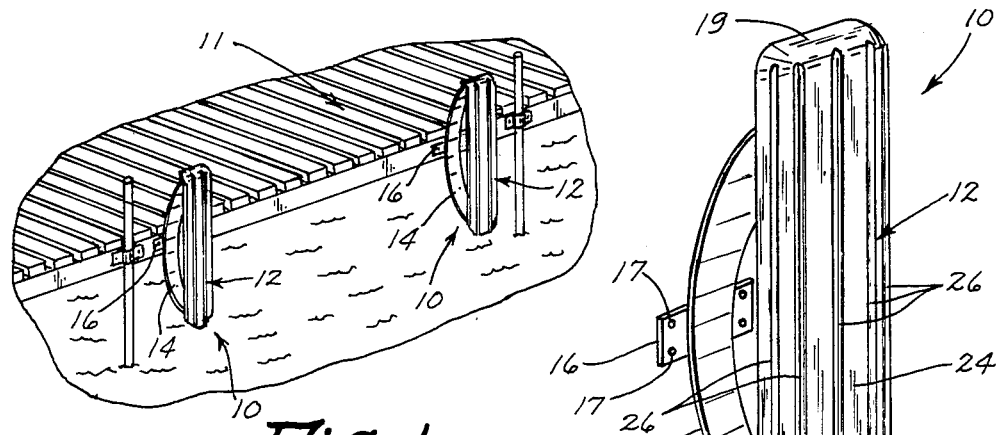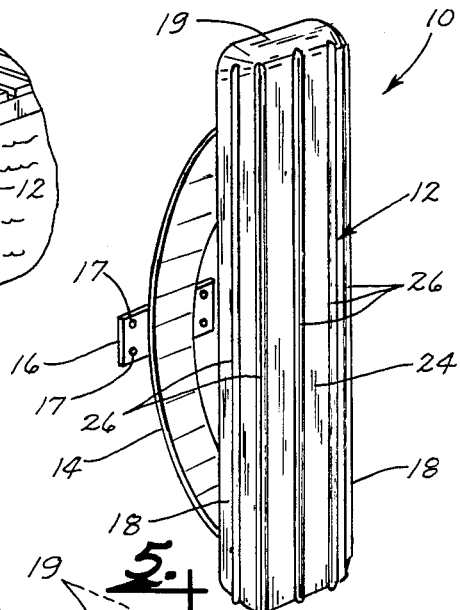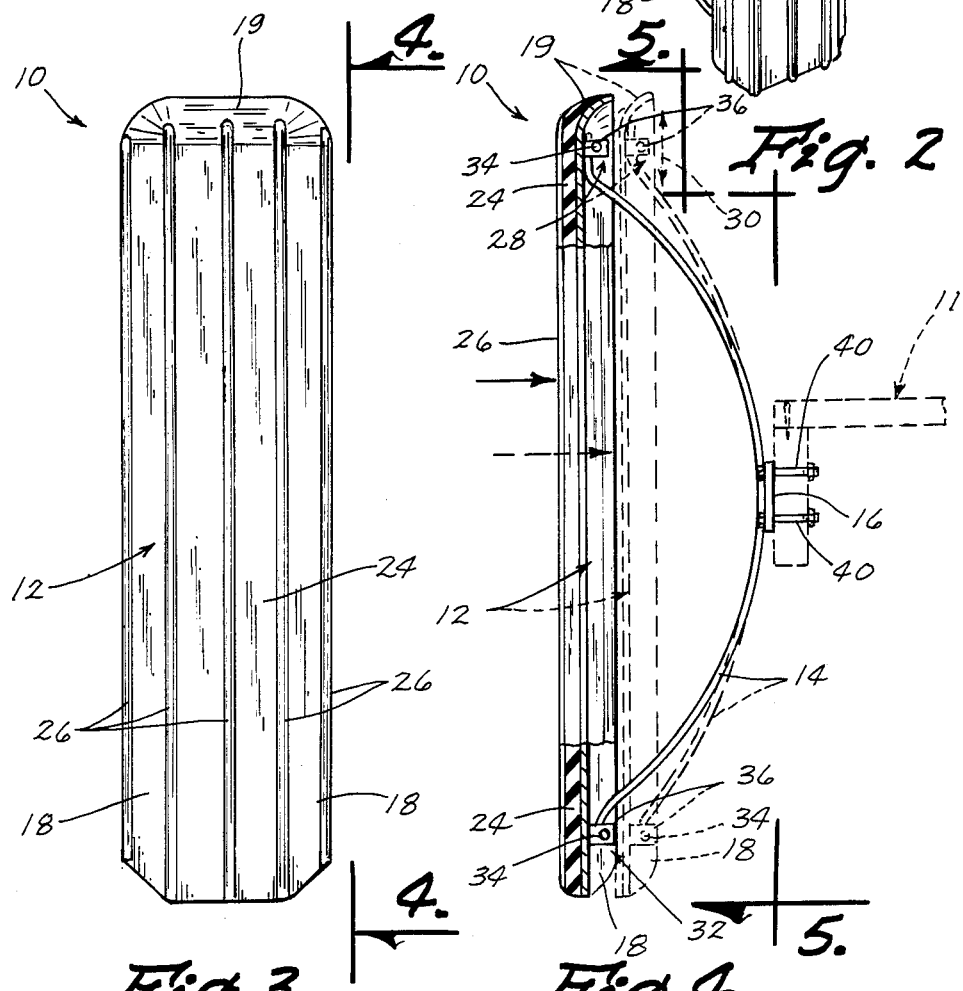

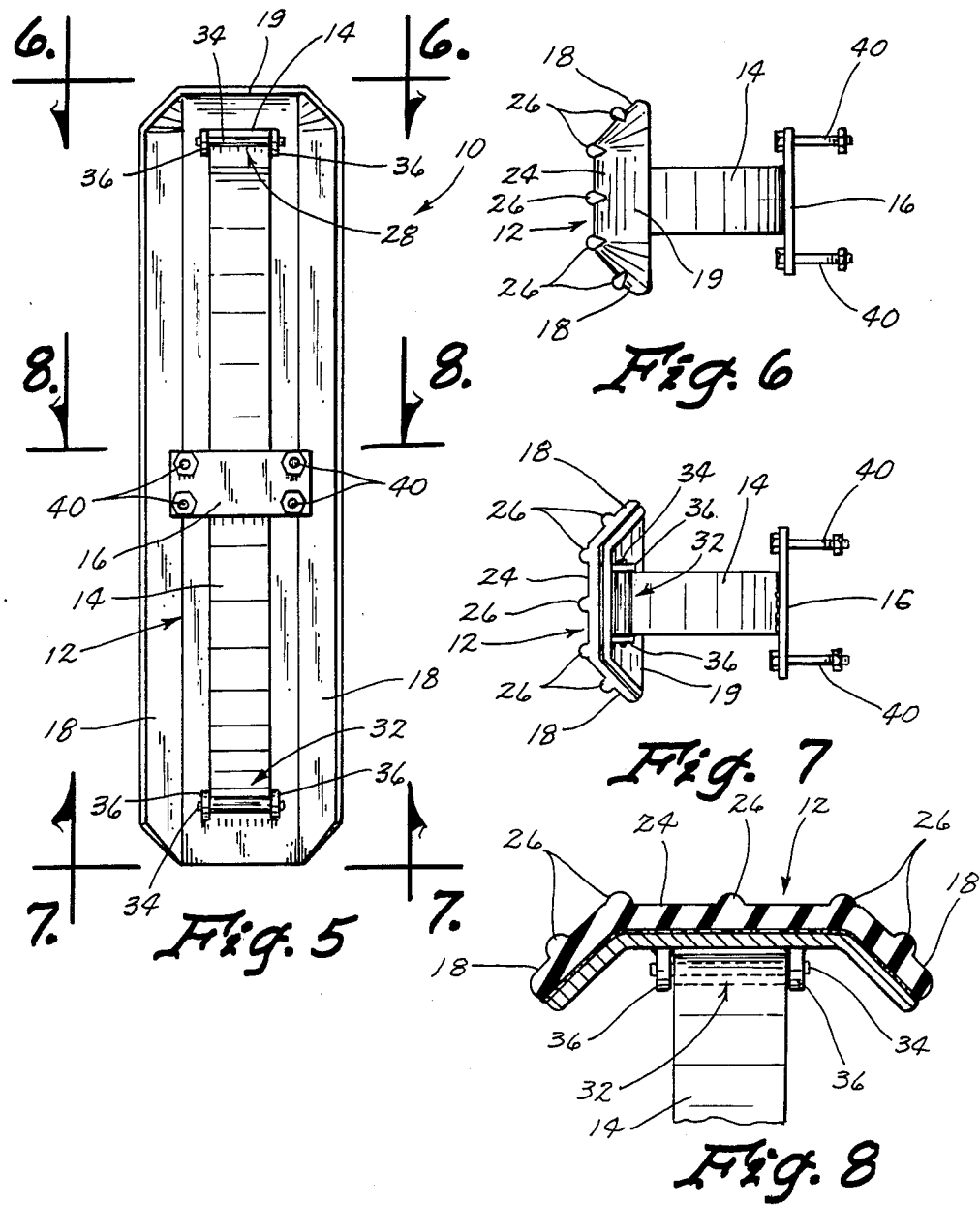

BOAT DOCK BUMPER

TECHNICAL FIELD

This invention relates to boat dock bumpers, and more particularly to a spring action type bumper.

BACKGROUND ART

Various methods and devices are known for minimizing damage to watercraft when attempting to dock a craft at a location on a dock. Such known devices typically include a tire bolted to the dock or even metal or wooden plates attached to the dock to take the impact of the craft when approaching the dock.

Such known devices are not effective in protecting the watercraft from damage to its hull. A watercraft may experience serious damage from hitting metal or wooden plates which are attached to a dock. A rubber tire secured to a dock is unsightly, as well as harboring a place for water to stagnate.

Those concerned with these and other problems recognize the need for an improved boat dock bumper.

DISCLOSURE OF THE INVENTION

The present invention provides a boat dock bumper including an elongated vertical plate having an inner face and an outer face. A spring steel strap attached to the inner face of the plate and disposed to bow away from the inner face. The strap is attached at one end of the plate by a sliding attachment and at the other end of the plate by a pivoting attachment. Means are provided by way of a plate for attaching the strap to a boat dock such that the outer face of the plate will contact the hull of an approaching watercraft. The plate is movable between an at-rest position and a compressed position when contacted by a watercraft.

An object of the present invention is the provision of an improved boat dock bumper.

Another object is to provide a boat dock bumper that is simple in structure.

A further object of the invention is the provision of a boat dock bumper that is inexpensive to manufacture.

Still another object is to provide a boat dock bumper that is durable.

A still further object of the present invention is the provision of a boat dock bumper that is easy to install and use.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a partial perspective view of the boat dock bumper of the present invention attached to a boat dock;

FIG. 2 is an enlarged perspective view of the boat dock bumper;

FIG. 3 is front elevational view of the boat dock bumper of the present invention;

FIG. 4 side elevational view of the boat dock bumper of the present invention taken along line 4—4 of FIG. 3 showing the boat dock bumper being movable between a compressed position (dashed lines) and an at-rest position (full lines) and showing its attachment to the dock (dashed lines), portions of the bent vertical side being cut away to show the sliding attachment of the upper portion of the spring steel strap and the pivoting attachment of the lower portion of the strap;

FIG. 5 is a rear elevational view of the boat dock bumper taken along line 5—5 in FIG. 4 showing the mounting plate attached by weldment to the spring steel strap;

FIG. 6 is a top plan view of the invention taken along 6—6 in FIG. 5;

FIG. 7 is a bottom plan view of the invention taken along line 7—7 in FIG. 5; and FIG. 8 is a sectional view of the invention taken along line 8—8 in FIG. 5.

BEST MODE FOR CARRYING OUT THE INVENTION

Referring now to the drawings, wherein like reference numerals designate identical or corresponding parts throughout the several views, FIG. 1 shows a pair of boat dock bumpers (10) of the present invention attached to a boat dock (11).

Referring now to FIGS. 2-4, the boat dock bumper (10) includes an elongated vertical plate (12) having an inner face and an outer face. A spring steel strap (14) is attached to the inner face of the elongated vertical plate (12). Welded to the spring steel strap (14) is a mounting plate (16) with openings (17) therein to accommodate fasteners. Disposed on each side of the elongated vertical plate (12) is a bent vertical face (18) disposed to angle inwardly at about 45°. At the top of plate (12), a bent horizontal face (19) angles inwardly and is joined to the bent vertical faces (18) by a smoothly contoured radius. The outer face of the vertical plate (12) is covered with a rubber-like material (24) that is bonded on the outer face thereof. Spaced vertical ribs (26) extend the length of the plate (12) to form a high-friction, non-abrasive surface.

As most clearly shown in FIGS. 4, and 5, the sliding attachment of the upper portion of the spring steel strap (14) to the inner face of the vertical plate (12) is accomplished by sliding movement of the upper portion of strap (14) through the retaining loop (28) attached to the inner face of plate (12). The travel of the strap (14) through the loop (28) is indicated by the directional arrow (30) in FIG. 4. The pivoting attachment of the lower portion of strap (14) to the plate (12) is accomplished by attachment of the lower portion of the strap (14) to pivot point (32). It is to be understood that the sliding attachment and the pivoting attachment of strap (14) could be formed of a nut and bolt arrangement (34) interconnecting lugs (36) extending from the inner face of plate (12).

As illustrated by FIG. 4, the bumper (10) is attached to the dock (11) by nut and bolt arrangement (40). In operation, a watercraft (not shown) will approach and impact the boat dock bumper (10). Upon impact, the elongated vertical plate (12) will move toward the compressed position illustrated by dashed lines in FIG. 4. Upon this compression, the upper portion of the strap (14) moves in an upward direction through the retaining loop (28), and the lower portion of the strap (14) pivots about the pivot point (32) to facilitate the sliding movement. After the force of the approaching watercraft is absorbed by the boat dock bumper (10), the bumper (10) returns to the at-rest position, illustrated by full lines in FIG. 4. The bent vertical faces (18) act to guide the watercraft into position parallel to the dock (11) and the rubber-like covering (24) acts to absorb force and provide a non-abrasive contact surface for the hull of the watercraft.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A boat dock bumper comprising:
   an elongated vertical plate having an inner face and an outer face;
   a spring steel strap attached to the inner face of said plate and disposed to bow away from said inner face, said strap being attached at one end by a sliding attachment to one end of said plate, and being attached at the other end by a pivoting attachment to the other end of said plate;
   means for attaching the strap to a boat dock such that the outer face of said plate is disposed to contact the hull of an approaching watercraft; and
   said plate being movable between an at rest position and a compressed position when contacted by the watercraft.

2. The boat dock bumper of claim 1 wherein a rubber-like material is bonded to the outer face of said plate.

3. The boat dock bumper of claim 2 wherein the rubber-like material includes a number of vertical rubber-like ribs disposed thereon.

4. The boat dock bumper of claim 1 wherein said plate includes a bent vertical face disposed to angle inwardly on each side of said plate.

5. The boat dock bumper of claim 1 wherein said plate includes a bent horizontal face disposed to angle inwardly at the top of said plate.

6. The boat dock bumper of claim 1 wherein the sliding attachment of the spring steel strap is secured by a nut and bolt arrangement.

7. The boat dock bumper of claim 1 wherein the pivoting attachment of the spring steel strap is secured by a nut and bolt arrangement.

8. The boat dock bumper of claim 4 wherein the bent vertical face on each side of said plate is curved inwardly at the top.

9. The boat dock bumper of claim 1 wherein the means for attaching the bumper to a dock is a mounting plate attached to said strap.

10. The boat dock bumper of claim 9 wherein the mounting plate is secured to said strap by weldment.

11. The boat dock bumper of claim 10 wherein said mounting plate includes a number of openings, and wherein said mounting plate is secured to the boat dock by a nut and bolt arrangement.

12. A boat dock bumper, comprising:
    an elongated vertical plate with a rubber-like covering having rubber-like vertical ribs thereon; said plate having an inner face and an outer face with a spring steel strap attached to the inner face, said strap being attached at one end by a sliding attachment and being attached at the other end by a pivoting attachment; the vertical plate including a bent vertical face disposed to angle inwardly on each side of said plate and a bent horizontal face disposed to angle inwardly at the top of said plate; said spring steel strap being attachable to a boat dock by means of a mounting plate attached to said strap.

* * * * *